US006678105B2

(12) United States Patent
Melas

(10) Patent No.: US 6,678,105 B2
(45) Date of Patent: Jan. 13, 2004

(54) NONLINEAR EQUALIZER AND DECODING CIRCUIT AND METHOD USING SAME

(75) Inventor: Constantin Michael Melas, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 09/858,907

(22) Filed: May 17, 2001

(65) Prior Publication Data

US 2002/0171961 A1 Nov. 21, 2002

(51) Int. Cl.$^7$ ................................................ G11B 5/09
(52) U.S. Cl. ............................ 360/45; 360/65; 360/46; 360/53; 375/232
(58) Field of Search ............................ 360/45, 65, 39, 360/40, 46, 53, 32; 375/229, 230, 232, 233, 234, 262, 263, 341, 348; 341/56, 64, 102, 95, 75, 74; 714/746, 769, 770, 794, 795

(56) References Cited

U.S. PATENT DOCUMENTS

| | | | |
|---|---|---|---|
| 4,266,204 A | | 5/1981 | Jacoby |
| 5,923,708 A | | 7/1999 | Mutoh |
| 5,999,355 A | | 12/1999 | Behrens et al. |
| 6,052,349 A | * | 4/2000 | Okamoto ................ 369/47.26 |
| 6,084,924 A | | 7/2000 | Melas |
| 6,141,783 A | | 10/2000 | Ashley et al. |

OTHER PUBLICATIONS

Nair et al., "Nonlinear Equalization for Data Storage Channels", May 1–5, 1994, IEEE, pp. 250–254.
Nair et al., "Improved Equalization for Digital Recording Using Nonlinear Filtering and Error Confinement", Apr. 4, 1994, IEEE, pp. 4221–4223.
Jeon et al., "Nonlinear Equalization for Reduction of Nonlinear Distortion in High–Density Recording Channels", Jun. 18–22, 1995, IEEE, pp. 503–507.
Zeng et al., "Systems Modeling of Nonlinear Effects in High Density Digital Magnetic Recording", 1994, IEEE, pp. 1139–1143.
Agazzi et al., "When Can Tentative Decisions be Used to Cancel (Linear or Nonlinear) Intersymbol Interference? (With Application to Magnetic Recording Channels)", Jun. 18–22, 1995, IEEE, pp. 647–652.
Hwang et al., "A Fast Adaptive RAM–based Decision Feedback Equalizer for Partial–Response Nonlinear Recording Channels", May 30–Jun. 2, 1994, IEEE, pp. 161–164.

* cited by examiner

Primary Examiner—Alan T. Faber
(74) Attorney, Agent, or Firm—Rao Coca, Esq.; McGinn & Gibb, PLLC

(57) ABSTRACT

A decoding circuit has a nonlinear equalizer which employs a signal conditioning algorithm for conditioning a partial response sampled signal to eliminate intersymbol interference. The inventive decoding circuit has an analog-to-digital converter for sampling an analog signal, a linear equalizer for adjusting the amplitude and phase relations of the sampled signal, a nonlinear equalizer for conditioning the sampled signal and outputting a partial response sampled signal having two nonzero samples, and a partial response maximum likelihood detector, for detecting the partial response sampled signal having two nonzero samples.

22 Claims, 4 Drawing Sheets

NONLINEAR EQUALIZER AND DECODING CIRCUIT AND METHOD USING SAME

BACKGROUND OF THE INVENTION

1. Field of the Invention

The present invention relates to a nonlinear equalizer and a decoding circuit and method using the same and, more particularly to a circuit and method having a nonlinear equalizer to eliminate intersymbol interference (ISI) in high density recording systems.

2. Description of the Related Art

Digital magnetic recording systems typically experience severe nonlinearity at high densities. As explained by W. Zeng and J. Moon in "Systems Modeling of Nonlinear Effects in High Density Digital Magnetic Recording" (IEEE GLOBE.COM., Vol. 2, pp. 1139–1143, 1994), this nonlinearity is caused by the strong interactions between the adjacent written transitions. The demagnetization field of a written transition can cause the shift in position and broadening of the next transition. Adjacent transitions also tend to erase each other, causing significant reduction in the signal amplitude. Such nonlinear distortion is commonly referred to collectively as nonlinear intersymbol interference (ISI).

Decision Feedback Equalization (DFE) is a well-known scheme used to detect signals transmitted across communications and recording channels with intersymbol interference. FIG. 1 shows a block diagram of a decoding circuit utilizing DFE 100. Such a circuit is typically used to recover data from a magnetic media or a communication channel. The analog signal from the read head is filtered by analog filter 102. The filtered analog signal is then applied to digital detection channel 104. Digital detection channel 104 includes an analog to digital converter (ADC) 106, a forward equalizer 108, threshold detector 110, decoder 112 and feedback equalizer 114. The ADC 106 samples the analog read signal at timing intervals defined by sample clock signal 116. The sampled read signal for digital detection channel 104 is equalized by forward equalizer 108. The binary data is detected by the threshold detector, 110 and input to decoder 112, which generates the final output data from the read circuit.

In the data recovery circuit utilizing DFE 100, the forward equalizer 108 shapes the readback pulse in a desired way and the feedback equalizer 114 attempts to cancel the nonlinear ISI. However, the feedback equalizer 114 cannot sufficiently eliminate nonlinear ISI in high density recording systems.

Another conventional solution to the problem of nonlinear ISI is a modified version of a DFE called a RAM-DFE. As explained by W. G. Jeon, J. S. Son, and Y. S. Cho, in "Nonlinear Equalization for Reduction of Nonlinear Distortion in High-Density Recording Channels" (IEEE International Conference on Communications, Vol. 1, pp. 503–507, 1995), in RAM-DFE, the feedback section of the decision feedback equalizer is replaced by a look-up table filter, so that this feedback table removes trailing nonlinear ISI that exists in the feedforward filter output. The feedforward section of the RAM-DFE remains linear.

However, because the feedforward section of the RAM-DFE has the same structure as the conventional DFE, it is not effective in reducing the nonlinear ISI existing in the precursor part. In addition, it requires a large memory of $2^N$ (where N is the number of consecutive inputs) and the convergence speed is slow because of the search time needed for the look-up table filter.

SUMMARY OF THE INVENTION

In view of the foregoing and other problems, disadvantages, and drawbacks of the conventional methods and structures, an object of the present invention is to provide a nonlinear equalizer which substantially removes intersymbol interference from a signal, particularly in a magnetic recording system, and which is faster and requires less memory than conventional decoding circuits.

In a first aspect, a nonlinear equalizer employs a signal conditioning algorithm for conditioning a partial response sampled signal having four nonzero samples into a three level signal. The nonlinear equalizer substantially eliminates intersymbol interference in an encoded analog signal. Further, the partial response sampled signal having four nonzero samples may include a PR4W sampled signal.

The nonlinear equalizer's signal conditioning algorithm may condition the partial response sampled signal having four nonzero samples to produce a plurality of samples $S_1$, $S_2$, $S_3$, and if sample $S_2$ is greater than 0.4 in absolute value, the magnitudes of samples $S_1$, and $S_3$ may be decreased by a predetermined rate by adding $-a \times$(the sign of $S_2$). The predetermined rate may be set, for example, at 0.2.

In another aspect, a decoding circuit includes an analog-to-digital converter for sampling an analog signal and outputting a partial response sampled signal having four nonzero samples, a linear equalizer for adjusting an amplitude and phase relations of the partial response sampled signal having four nonzero samples, a nonlinear equalizer for conditioning the partial response sampled signal having four nonzero samples and outputting a partial response sampled signal having two nonzero samples, and a partial response maximum likelihood detector, for detecting the partial response sampled signal having two nonzero samples. The decoding circuit may be used in a high density recording system. The decoding circuit may further include an analog filter for filtering the analog signal and outputting a filtered analog signal to the analog-to-digital converter, and a decoder, for inputting the partial response sampled signal having two nonzero samples from the partial response maximum likelihood detector and outputting a decoded data signal.

The nonlinear equalizer may modify samples independently of binary decisions. In addition, if an amplitude of a middle sample meets a predetermined condition, the nonlinear equalizer may modify previous and past samples by a predetermined amount.

In another aspect of the present invention, a method for recovering information coded onto an analog signal and recorded onto a tracked storage medium includes sampling the analog signal to produce a partial response sampled signal having a sequence of four non-zero samples $S_1$, $S_2$, $S_3$, $S_4$, conditioning the partial response sampled signal according to a signal conditioning algorithm to produce a three level signal, detecting the three level signal using a partial response maximum likelihood detector, and decoding the three level signal to produce a decoded data signal.

In another aspect, a magnetic recording system includes the above-mentioned decoding circuit. As noted above, the partial response sampled signal having two nonzero samples may be substantially devoid of intersymbol interference.

The inventive decoding circuit may also be part of an information handling/computer system. In addition, the present invention includes a programmable storage medium (e.g., a diskette) tangibly embodying a program of machine-readable instructions executable by a digital processing apparatus for performing the inventive method.

The unique and novel aspects of the present invention combine to provide an inventive decoding circuit which substantially removes intersymbol interference from a coded analog signal in a magnetic recording system and is faster and requires less memory than conventional decoding circuits.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF THE PREFERRED EMBODIMENTS OF THE INVENTION

Figure 2:
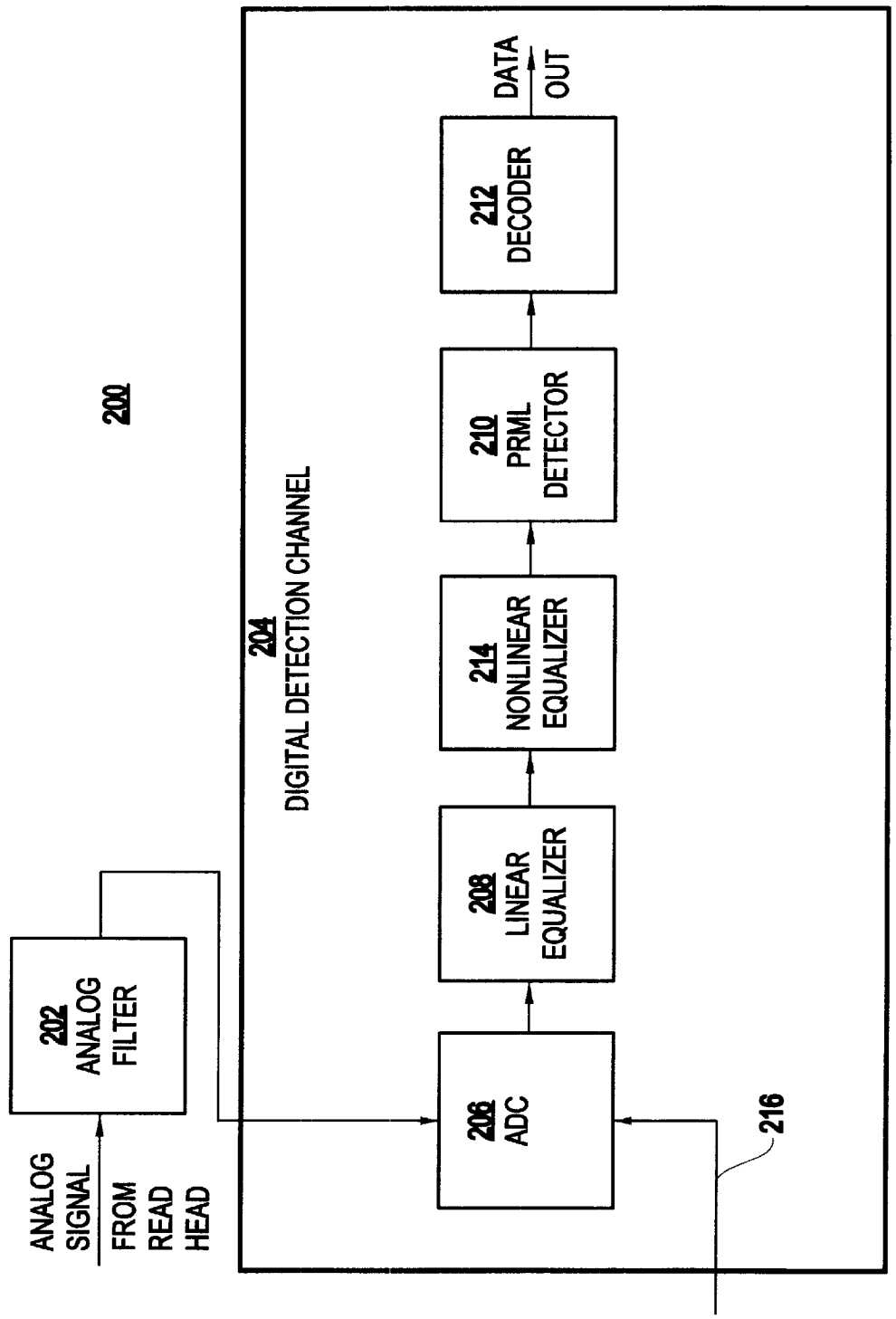
FIG. 2 shows a data recovery circuit 200 for a read channel using a nonlinear equalizer to eliminate intersymbol interference according to the present invention.

Referring now to the drawings, FIG. 2 is a block diagram showing a preferred embodiment of a data recovery circuit 200 according to the present invention.

As indicated in FIG. 2, in response to a read request, an analog signal from a read head is filtered by analog filter 202. The filtered analog signal is then applied to the digital detection channel 204 which includes an analog-to-digital converter (ADC) 206, linear equalizer 208, nonlinear equalizer 214, a partial response maximum likelihood (Viterbi) detector 210, and a decoder 212.

In the ADC 206, the filtered signal is sampled by clock 216. In conventional data recovery circuits, the analog-to-digital circuit typically samples the analog signal according to partial response, class IV metrics. However, in the inventive circuit 200, the ADC 206 samples the analog signal according to "PR4 wide" (PR4W) metrics so as to output a partial response sampled signal having four nonzero samples.

The PR4W sampling metric was created by the inventor for the purpose of increasing signaling density. For example, a transition response in PR4 has just 2 nonzero samples: 0, 1, 1, 0. However, PR4W has 4 nonzero samples, PR4W: a11a (a>0).

Experiments have revealed that for a=0.21, PR4W can be considered an EPR4 signal with a T/2 sample timing shift. In other words, a PR4W response can be time shifted to provide a partial response sampled signal having two non-zero samples, such as, for example, an EPR4 response. For example, a PR4W response of 0.21, 1, 1, 0.21 can be time shifted to become the EPR4 response 0, 1, 2, 1, 0 (i.e., 0.21, 1, 1, 0.21×1.4 (PR4W)=0.3, 1.4, 1.4, 0.3 (shift)=0, 1, 2, 1, 0 (EPR4). Therefore, a response in PR4W requires the same equalizer as a response in EPR4, and is therefore, capable of higher density signaling for a given data signal.

From the ADC 208, the samples are applied to the linear equalizer 209 where adjustments are made in the amplitude and phase relations among the sample signal components to compensate for any undue attenuation or time delays. This equalizer may be an EPR4 equalizer, the output from the which is the weighted sum of n consecutive samples.

The sampled signal is output from the linear equalizer 208 to the inventive nonlinear equalizer 214 to remove intersymbol interference. Generally, a nonlinear equalizer modifies previous and past samples by a fixed amount if the amplitude of the middle sample(s) meets a specific condition. For example, a simple nonlinear equalizer algorithm is "if the magnitude of a sample exceeds M, then modify the previous and past samples by a quantity Q."

The inventive nonlinear equalizer 208 conditions the PR4W signal to remove intersymbol interference caused by additional samples. Moreover, the inventive nonlinear equalizer 214 allows PRML detection (i.e., Viterbi detection) by restoring a three level signal (i.e., b, 0, −b). For a sampled signal having samples S1, S2, S3 the inventive nonlinear equalizer 214 employs a signal conditioning algorithm as follows: if sample $S_2$ is greater than 0.4 in absolute value, the magnitudes of samples S1, and $S_3$ are decreased by a=0.2, by adding −a×(the sign of $S_2$).

The improvement of the inventive nonlinear equalizer 214 employing the above-referenced signal conditioning algorithm over conventional devices for eliminating intersymbol interference can be seen by first computing the minimum sample margin (bit by bit) and Viterbi margin, when the transition response is 0.2, 1, 1, 0.2. Here, instead of the three level +1, 0, −1 (i.e., sample margin 0.5) there are the levels ±0.2, ±0.6, ±0.8, ±1, 0. Thus, the highest "zero" level is 0.2 and the lowest "one" level is 0.6. When the thresholds are set to ±0.4, the sample margin is 0.2 (i.e., if the noise changes a sample by 0.2, an error can occur). To get the Viterbi margin, consider the S sample sequence (i.e., $S_1$, $S_2$, $S_3$) of 0.2, 0.2, 0.6. The larger of samples $S_1$ and $S_3$ is decoded as a "one". If $S_1$ changes (e.g., increases) by 0.4 or more, the larger of samples $S_1$ and $S_3$ is decoded as a "one" and the minimum Viterbi margin is 0.4.

For example, if the above-referenced algorithm is applied to the following PR4W sequence: (S1,S2,S3,S4,S5,S6,S7,S8,S9,S10,S11)=(−0.8, −0.2, +0.2, +0.8, 0, −0.6, ±0.6, ±0.2, ±0.2, ±0.6, −0.8, −1), samples 2 and 3 become 0, because of samples 1 and 4, sample 5 gets 2 canceling adjustments, sample 6 becomes −0.8, sample 7 becomes +0.8, samples 8, 9 and 10 become 0, 0 and +0.8, respectively, and sample 11 stays at −0.8 as it gets no canceling adjustments. Thus, the algorithm produces the new sequence −0.8, 0, 0, +0.8, 0, −0.8, +0.8, 0, 0, +0.8, −0.8, −0.8. Therefore, a three level signal is recovered, thereby allowing PRML (Viterbi) detection which is simple and cost effective.

From the nonlinear equalizer 214, the three level signal is applied to the partial response maximum likelihood (Viterbi) detector 210. The binary data is detected by the Viterbi detector 210 and input to decoder 112, which generates the final output data from the data recovery circuit 200.

Therefore, the inventive nonlinear equalizer 214 allows the higher density EPR4 waveform to be detected with simpler PR4 timing and detection circuits. In other words, the conventional Viterbi detector can be used to detect the resulting waveform. Thus, the inventive decoding circuit 200 solves the problems of the conventional data recovery circuit by extending the use of PR4 to higher density magnetic recording.

Figure 1:
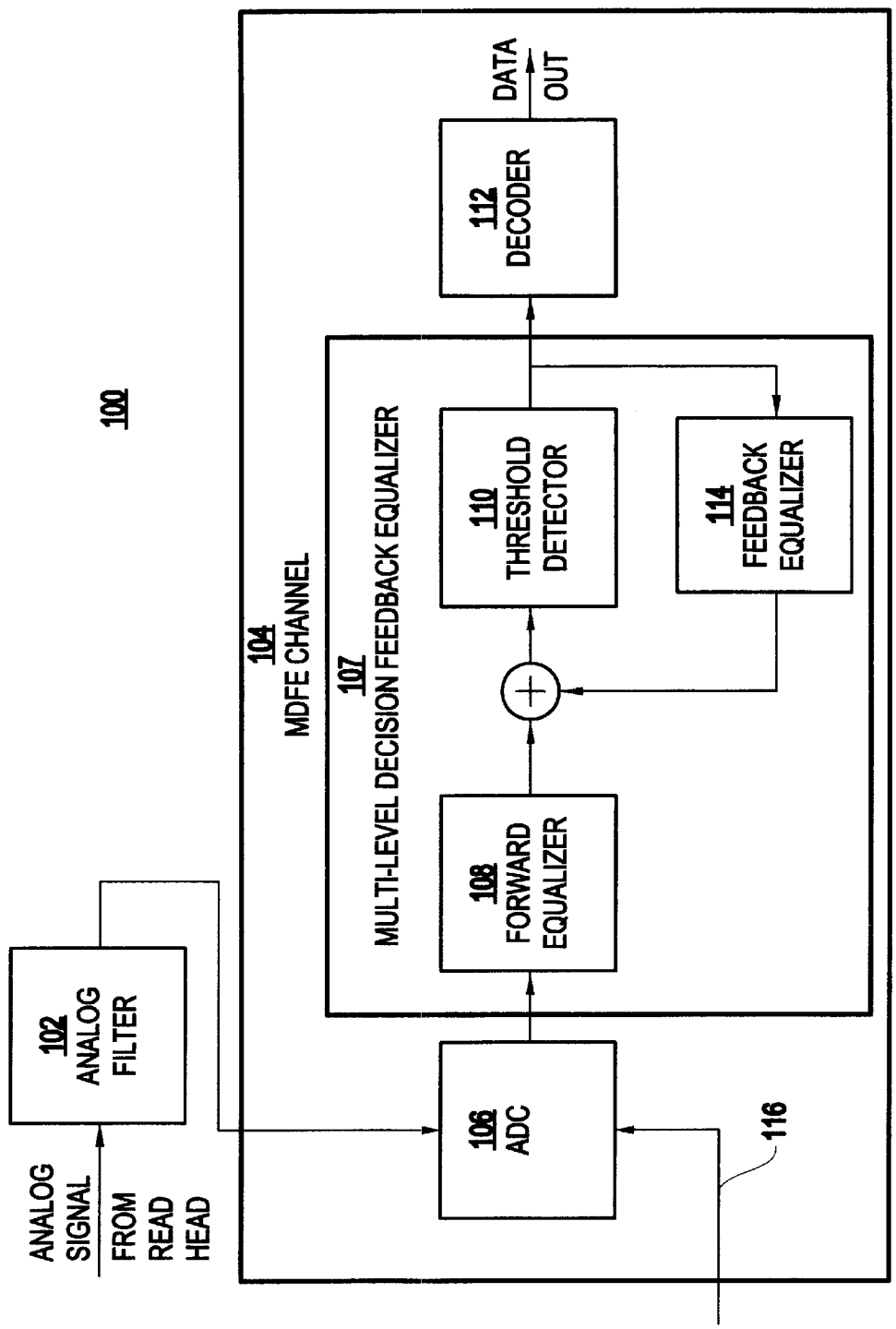
FIG. 1 shows a conventional read channel 100 using decision feedback equalization to eliminate intersymbol interference.

Further, unlike the multilevel decision feedback equalizer channel 104 in FIG. 1, which adjusts sample amplitude based on past decisions, the digital detection channel 204 having a nonlinear equalizer 214 modifies samples independently of binary decisions which allows the present invention to more effectively remove intersymbol interference in high-density magnetic recording systems. Furthermore, the inventive decoding circuit 200 does not require the large memories required for conventional decoding circuits using decision feedback equalization.

Figure 3:
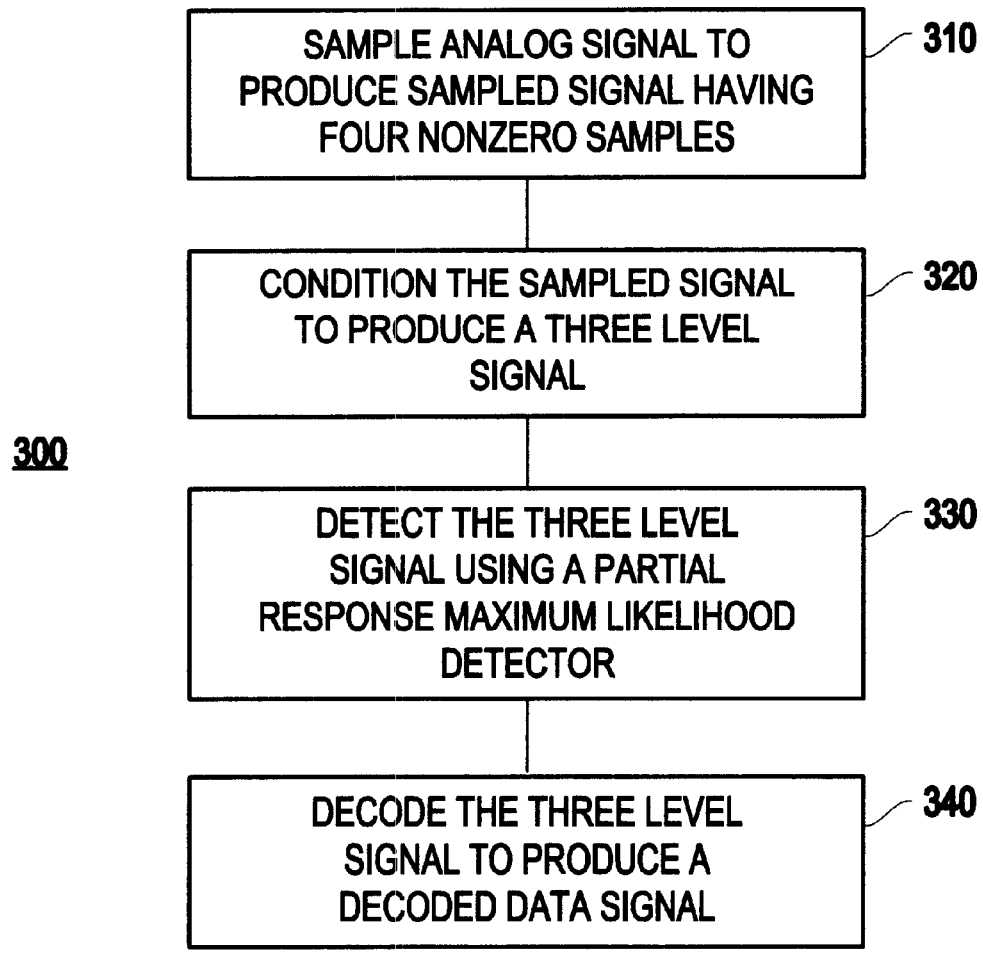
FIG. 3 shows a flowchart for a method for eliminating intersymbol interference in a read channel according to the present invention.

In addition, FIG. 3 is a block diagram showing a method (300) for conditioning an encoding signal according to the present invention.

As shown in FIG. 3, the analog signal is first sampled (310) to produce a sampled signal having a sequence of four non-zero samples $S_1$, $S_2$, $S_3$, $S_4$. This may be performed by an analog-to-digital converter according in response to a clock signal.

The sampled signal is then conditioned (320) according to a signal conditioning algorithm to produce a three level signal. The signal conditioning algorithm employed may be as follows: if sample $S_3$ is greater than 0.4 in absolute value, the magnitudes of samples $S_1$, and $S_2$ are decreased by a=0.2, by adding $-a+S_3$.

The coded information on the sampled signal is then detected (330) using a partial response maximum likelihood detector and decoded (340).

Figure 4:
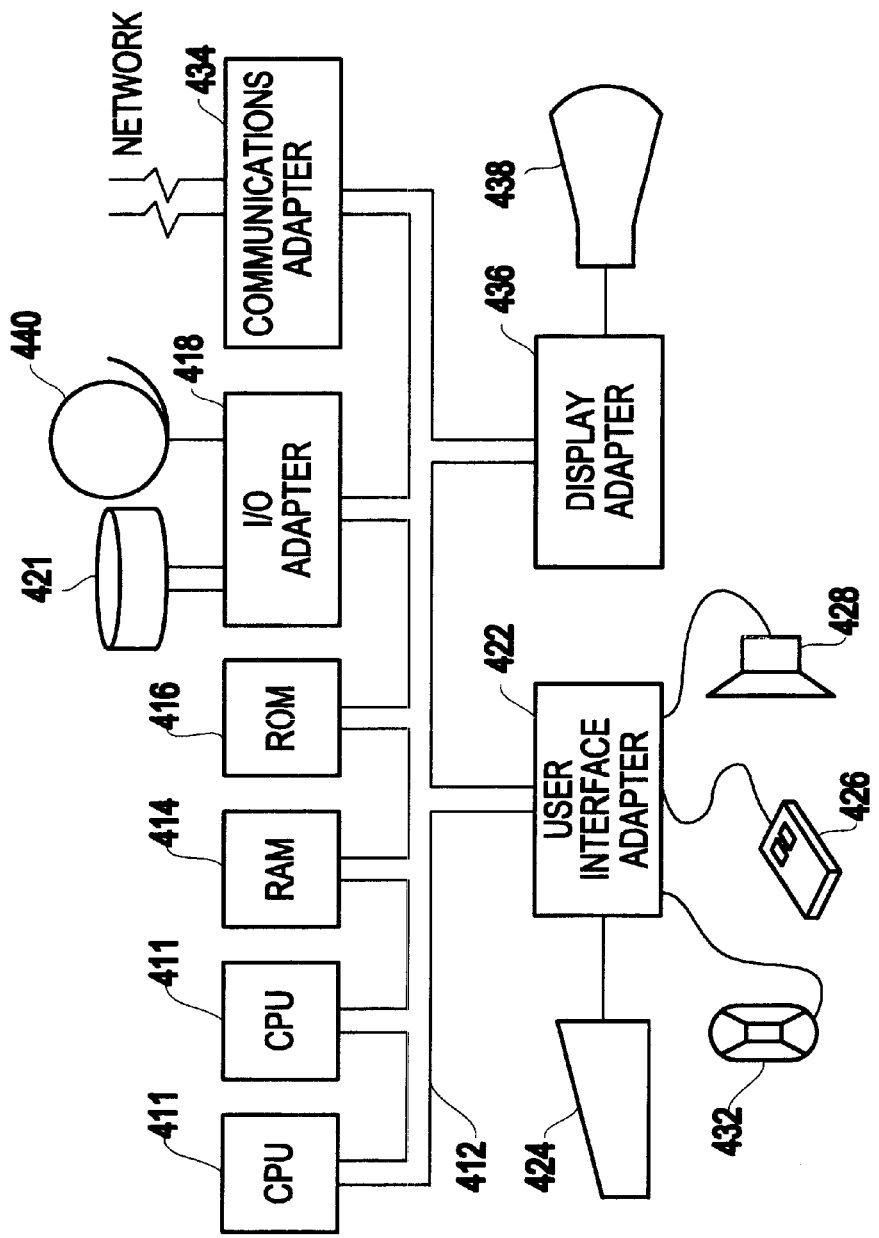
FIG. 4 illustrates an exemplary hardware/information handling system 400 for incorporating the present invention therein.

In addition, the present invention may be a part of an information handling/computer system. FIG. 4 illustrates a typical hardware configuration of an information handling/computer system in accordance with the invention and which preferably has at least one processor or central processing unit (CPU) 411.

The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting an information handling system to a data processing network, the Internet, an Intranet, a personal area network (PAN), etc., and a display adapter 436 for connecting the bus 412 to a display device 438 and/or printer 439 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 411 and hardware above, to perform the method of the invention.

Figure 5:
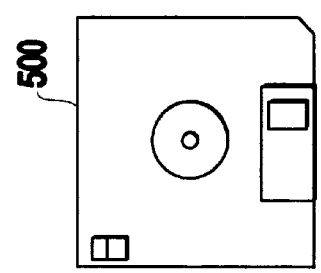
FIG. 5 illustrates a signal bearing medium 500 (i.e., storage medium) for storing steps of a program method according to the present invention.

This signal-bearing media may include, for example, a RAM contained within the CPU 411, as represented by the fast-access storage for example. Alternatively, the instructions may be contained in another signal-bearing media, such as a magnetic data storage diskette 500 (FIG. 5), directly or indirectly accessible by the CPU 411.

Whether contained in the diskette 500, the computer/CPU 411, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Therefore, the unique and novel aspects of the claimed invention provide a circuit and method for conditioning an encoding signal which has a nonlinear equalizer and removes intersymbol interference from a read signal in a magnetic recording system and is faster and requires less memory than conventional circuits and methods.

While a preferred embodiment of the present invention has been described above, it should be understood that it has been provided as an example only. Thus, those skilled in the art will recognize that the invention can be practiced with modification within the spirit and scope of the appended claims.

Specifically, it should be noted that this invention pertains wherever coded analog signals are sampled including communications systems and information recording and storage systems. For instance, in the preceding paragraphs, a disk storage device is described as a host for this invention. However, this is merely illustrative and should not be construed as limiting.

What I claim is:

1. A nonlinear equalizer comprising:
   an input for inputting a partial response sampled signal having four nonzero samples; and
   an output for outputting a three level signal,
   wherein said partial response sampled signal having four nonzero samples is conditioned into said three level signal using a signal conditioning algorithm in which, if a sample $S_0$ has an absolute value greater than a predetermined value, the magnitudes of neighboring samples $S_{-1}$ and $S_1$ are modified by a predetermined amount.

2. The nonlinear equalizer according to claim 1, wherein said partial response sampled signal having four nonzero samples comprises a PR4W sampled signal.

3. The nonlinear equalizer according to claim 1, wherein if sample $S_0$ is greater than 0.4 in absolute value, the magnitudes of samples $S_{-1}$ and $S_1$ are decreased by a predetermined amount.

4. The nonlinear equalizer according to claim 3, wherein said predetermined amount comprises 0.2.

5. The nonlinear equalizer according to claim 1, wherein said nonlinear equalizer substantially eliminates intersymbol interference in an encoded analog signal.

6. A decoding circuit comprising:
   an analog-to-digital converter for sampling an analog signal and outputting a partial response sampled signal having four nonzero samples;
   a linear equalizer for adjusting an amplitude and phase relations of said partial response sampled signal having four nonzero samples;
   a nonlinear equalizer for conditioning said partial response sampled signal having four nonzero samples and outputting a three level signal; and a partial response maximum likelihood detector, for detecting said three level signal, wherein said partial response sampled signal having four nonzero samples is conditioned into said three level signal using a signal conditioning algorithm in which, if a sample $S_0$ has an absolute value greater than a predetermined value, the magnitudes of neighboring samples $S_{-1}$ and $S_1$ are modified by a predetermined amount.

7. The decoding circuit according to claim 6, wherein said partial response sampled signal having four nonzero samples comprises a PR4W signal.

8. The decoding circuit according to claim 6, wherein said nonlinear equalizer is coupled to an output of said linear equalizer.

9. The decoding circuit according to claim 6, wherein said decoding circuit is used in a high density recording system.

10. The decoding circuit according to claim 6, wherein if sample $S_0$ is greater than 0.4 in absolute value, the magnitudes of samples $S_{-1}$ and $S_1$ are decreased by a predetermined amount.

11. The decoding circuit according to claim 10, wherein said predetermined amount comprises 0.2.

12. The decoding circuit according to claim 6, further comprising:

an analog filter for filtering said analog signal and outputting a filtered analog signal to said analog-to-digital converter; and a decoder, for inputting said three level signal from said partial response maximum likelihood detector and outputting a decoded data signal.

13. The decoding circuit according to claim 6, wherein said three level signal is substantially devoid of intersymbol interference.

14. The decoding circuit according to claim 6, wherein said linear equalizer comprises an EPR4 equalizer.

15. The decoding circuit according to claim 6, wherein said nonlinear equalizer modifies samples independently of binary decisions.

16. The decoding circuit according to claim 6, wherein the magnitudes of neighboring samples $S_{-1}$ and $S_1$ are decreased by 0.2.

17. A method for recovering information coded onto an analog signal and recorded onto a tracked storage medium, said method comprising:

sampling said analog signal to produce a partial response sampled signal having a sequence of four non-zero samples;

conditioning said partial response sampled signal according to a signal conditioning algorithm to produce a three level signal;

detecting said three level signal using a partial response maximum likelihood detector; and decoding said three level signal to produce a decoded data signal, wherein in said signal conditioning algorithm, if a sample $S_0$ has an absolute value greater than a predetermined value, the magnitudes of neighboring samples $S_{-1}$ and $S_1$ are modified by a predetermined amount.

18. The method according to claim 17, wherein if sample $S_0$ is greater than 0.4 in absolute value, the magnitudes of samples $S_{-1}$ and $S_1$ are decreased by a predetermined amount.

19. A magnetic recording system comprising a decoding circuit for decoding a read signal, said decoding circuit comprising:

an analog-to-digital converter for sampling an analog signal and outputting a partial response sampled signal having four nonzero samples;

a linear equalizer for adjusting an amplitude and phase relations of said partial response sampled signal having four nonzero samples;

a nonlinear equalizer for conditioning said partial response sampled signal having four nonzero samples and outputting a three level signal; and a partial response maximum likelihood detector, for detecting said three level signal, wherein said partial response sampled signal having four nonzero samples is conditioned into said three level signal using a signal conditioning algorithm in which, if a sample $S_0$ has an absolute value greater than a predetermined value, the magnitudes of neighboring samples $S_{-1}$ and $S_1$ are modified by a predetermined amount.

20. The magnetic recording system according to claim 19, wherein said three level signal is substantially devoid of intersymbol interference.

21. A digital detection channel comprising:

an analog-to-digital converter for sampling an analog signal and outputting a partial response sampled signal having four nonzero samples;

a linear equalizer for adjusting an amplitude and phase relations of said partial response sampled signal having four nonzero samples;

a nonlinear equalizer for conditioning said sampled signal and outputting a three level signal; and a partial response maximum likelihood detector, for detecting said three level signal, wherein said sampled signal is conditioned into said three level signal using a signal conditioning algorithm in which, if a sample $S_0$ has an absolute value greater than a predetermined value, the magnitudes of neighboring samples $S_{-1}$ and $S_1$ are modified by a predetermined amount.

22. A programmable storage medium tangibly embodying a program of machine-readable instructions executable by a digital processing apparatus to perform method for recovering information coded into an analog signal and recorded onto a tracked storage medium, said method comprising:

sampling said analog signal to produce a partial response sampled signal having a sequence of four non-zero samples;

conditioning said partial response sampled signal according to a signal conditioning algorithm to produce a three level signal;

detecting said three level signal using a partial response maximum likelihood detector;

decoding said three level signal to produce a decoded data signal, wherein said partial response sampled signal is conditioned into said three level signal using a signal conditioning algorithm in which, if a sample $S_0$ has an absolute value greater than a predetermined value, the magnitudes of neighboring samples $S_{-1}$ and $S_1$ are modified by a predetermined amount.

* * * * *